US008532277B2

(12) United States Patent
Hines et al.

(10) Patent No.: US 8,532,277 B2
(45) Date of Patent: *Sep. 10, 2013

(54) LOCATION DERIVED PRESENCE INFORMATION

(75) Inventors: Gordon John Hines, Kirkland, WA (US); Mario G. Tapia, Seattle, WA (US); Will Cousins, Seattle, WA (US); Patrick Carey, Seattle, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 81 days.

This patent is subject to a terminal disclaimer.

(21) Appl. No.: 13/200,821

(22) Filed: Oct. 3, 2011

(65) Prior Publication Data

US 2012/0028651 A1 Feb. 2, 2012

Related U.S. Application Data

(63) Continuation of application No. 12/007,947, filed on Jan. 17, 2008, now Pat. No. 8,032,112, which is a continuation of application No. 10/395,217, filed on Mar. 25, 2003, now Pat. No. 7,426,380.

(60) Provisional application No. 60/367,708, filed on Mar. 28, 2002.

(51) Int. Cl.
*H04M 3/42* (2006.01)
*H04M 11/04* (2006.01)

(52) U.S. Cl.
USPC ............ 379/201.1; 342/357.25; 342/357.46; 342/357.47; 455/404.2; 455/414.2; 455/435.1; 455/456.3

(58) Field of Classification Search
USPC ............ 342/357.01, 357.06, 357.09, 357.13, 342/357.25, 357.46, 357.47; 455/404.2, 455/410, 411, 414.2, 435.1, 456.1, 456.2, 455/456.3, 457, 461, 11.1; 379/201.01, 201.06–201.1
See application file for complete search history.

(56) References Cited

U.S. PATENT DOCUMENTS

| | | | |
|---|---|---|---|
| 1,103,073 A | 7/1914 | O'Connell |
| 4,445,118 A | 4/1984 | Taylor et al. |
| 4,494,119 A | 1/1985 | Wimbush |
| 4,651,156 A | 3/1987 | Martinez |

(Continued)

FOREIGN PATENT DOCUMENTS

| | | |
|---|---|---|
| WO | WO9921380 | 4/1999 |
| WO | WO0040038 | 7/2000 |

(Continued)

OTHER PUBLICATIONS

International Search Report received in PCT/US2011/001990 dated Apr. 24, 2012.

(Continued)

*Primary Examiner* — Harry Hong
(74) *Attorney, Agent, or Firm* — William H. Bollman

(57) ABSTRACT

The number of messages required in networks where both location and presence services are deployed may be reduced, by retrieving presence data from messages otherwise intended to provide only location information. Thus, information determined in a location service scheme is utilized to provide a presence service as well. A location server requests mobile subscriber (MS) information from a Core Network (CN) Node (i.e. HLR, MSC, etc.) that can be used in determining the Location of the MS. A single message aggregates retrieval of information for two services, specifically, for both location and presence.

20 Claims, 2 Drawing Sheets

(56) References Cited

U.S. PATENT DOCUMENTS

| | | |
|---|---|---|
| 4,706,275 A | 11/1987 | Kamil |
| 4,891,638 A | 1/1990 | Davis |
| 4,891,650 A | 1/1990 | Scheffer |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Scheffer |
| 5,068,656 A | 11/1991 | Sutherland |
| 5,068,891 A | 11/1991 | Marshall |
| 5,070,329 A | 12/1991 | Jasimaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Caroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicke |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,432,841 A | 7/1995 | Rimer |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaugh |
| 5,485,163 A | 1/1996 | Singer et al. |
| 5,488,563 A | 1/1996 | Chazelle |
| 5,494,091 A | 2/1996 | Freeman |
| 5,497,149 A | 3/1996 | Fast |
| 5,504,491 A | 4/1996 | Chapman |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,689,245 A | 11/1997 | Noreen |
| 5,699,053 A | 12/1997 | Jonsson |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vantilla |
| 5,797,094 A | 8/1998 | Houde |
| 5,797,096 A | 8/1998 | Lupien |
| 5,802,492 A | 9/1998 | DeLorrme |
| 5,806,000 A | 9/1998 | Vo |
| 5,809,415 A | 9/1998 | Rossmann |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,835,907 A | 11/1998 | Newman |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard |
| 5,930,250 A | 7/1999 | Klok |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao |
| 5,987,323 A | 11/1999 | Houtari |
| 5,998,111 A | 12/1999 | Abe |
| 5,999,124 A | 12/1999 | Sheynblat |
| 6,014,602 A | 1/2000 | Kithil |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |

| | | | | | | |
|---|---|---|---|---|---|---|
| 6,061,346 | A | 5/2000 | Nordman | 6,377,810 B1 | 4/2002 | Geiger et al. |
| 6,064,336 | A | 5/2000 | Krasner | 6,400,314 B1 | 6/2002 | Krasner |
| 6,064,875 | A | 5/2000 | Morgan | 6,400,958 B1 | 6/2002 | Isomursu |
| 6,067,045 | A | 5/2000 | Castelloe | 6,411,254 B1 | 6/2002 | Moeglein |
| 6,070,067 | A | 5/2000 | Nguyen | 6,421,002 B2 | 7/2002 | Krasner |
| 6,075,982 | A | 6/2000 | Donovan | 6,427,001 B1 | 7/2002 | Contractor |
| 6,081,229 | A | 6/2000 | Soliman | 6,433,734 B1 | 8/2002 | Krasner |
| 6,081,508 | A | 6/2000 | West | 6,434,381 B1 | 8/2002 | Moore |
| 6,085,320 | A | 7/2000 | Kaliski, Jr. | 6,442,391 B1 | 8/2002 | Johansson |
| 6,101,378 | A | 8/2000 | Barabush | 6,449,473 B1 | 9/2002 | Raivisto |
| 6,104,931 | A | 8/2000 | Havinis et al. | 6,449,476 B1 | 9/2002 | Hutchison, IV |
| 6,108,533 | A | 8/2000 | Brohoff | 6,456,852 B2 | 9/2002 | Bar |
| 6,122,503 | A | 9/2000 | Daly | 6,463,272 B1 | 10/2002 | Wallace |
| 6,122,520 | A | 9/2000 | Want | 6,477,150 B1 | 11/2002 | Maggenti |
| 6,124,810 | A | 9/2000 | Segal | 6,504,491 B1 | 1/2003 | Christians |
| 6,131,067 | A | 10/2000 | Girerd | 6,505,049 B1 | 1/2003 | Dorenbosch |
| 6,133,874 | A | 10/2000 | Krasner | 6,510,387 B2 | 1/2003 | Fuchs |
| 6,134,483 | A | 10/2000 | Vayanos | 6,512,922 B1 | 1/2003 | Burg |
| 6,138,003 | A | 10/2000 | Kingdon et al. | 6,512,930 B2 | 1/2003 | Sandegren |
| 6,148,197 | A | 11/2000 | Bridges | 6,515,623 B2 | 2/2003 | Johnson |
| 6,148,198 | A | 11/2000 | Anderson | 6,519,466 B2 | 2/2003 | Pande |
| 6,149,353 | A | 11/2000 | Nilsson | 6,522,682 B1 | 2/2003 | Kohli |
| 6,150,980 | A | 11/2000 | Krasner | 6,529,500 B1 | 3/2003 | Pandharipande |
| 6,154,172 | A | 11/2000 | Piccionelli | 6,529,829 B2 | 3/2003 | Turetzky |
| 6,169,891 | B1 | 1/2001 | Gorham | 6,531,982 B1 | 3/2003 | White |
| 6,169,901 | B1 | 1/2001 | Boucher | 6,538,757 B1 | 3/2003 | Sansone |
| 6,169,902 | B1 | 1/2001 | Kawamoto | 6,539,200 B1 | 3/2003 | Schiff |
| 6,173,181 | B1 | 1/2001 | Losh | 6,539,232 B2 | 3/2003 | Hendrey et al. |
| 6,178,505 | B1 | 1/2001 | Schneider | 6,539,304 B1 | 3/2003 | Chansarkar |
| 6,178,506 | B1 | 1/2001 | Quick, Jr. | 6,542,464 B1 | 4/2003 | Takeda |
| 6,181,935 | B1 | 1/2001 | Gossman | 6,542,734 B1 | 4/2003 | Abrol |
| 6,181,939 | B1 | 1/2001 | Ahvenainen | 6,542,743 B1 | 4/2003 | Soliman |
| 6,185,427 | B1 | 2/2001 | Krasner et al. | 6,549,776 B1 | 4/2003 | Joong |
| 6,188,354 | B1 | 2/2001 | Soliman | 6,549,844 B1 | 4/2003 | Egberts |
| 6,188,752 | B1 | 2/2001 | Lesley | 6,553,236 B1 | 4/2003 | Dunko et al. |
| 6,188,909 | B1 | 2/2001 | Alanara | 6,556,832 B1 | 4/2003 | Soliman |
| 6,189,098 | B1 | 2/2001 | Kaliski, Jr. | 6,560,461 B1 | 5/2003 | Fomukong |
| 6,195,557 | B1 | 2/2001 | Havinis | 6,560,534 B2 | 5/2003 | Abraham |
| 6,198,431 | B1 | 3/2001 | Gibson | 6,570,530 B2 | 5/2003 | Gaal |
| 6,199,045 | B1 | 3/2001 | Giniger | 6,571,095 B1 | 5/2003 | Koodli |
| 6,199,113 | B1 | 3/2001 | Alegre | 6,574,558 B2 | 6/2003 | Kohli |
| 6,205,330 | B1 | 3/2001 | Windbladh | 6,580,390 B1 | 6/2003 | Hay |
| 6,208,290 | B1 | 3/2001 | Krasner | 6,584,552 B1 | 6/2003 | Kuno |
| 6,208,854 | B1 | 3/2001 | Roberts | 6,587,691 B1 | 7/2003 | Granstam |
| 6,215,441 | B1 | 4/2001 | Moeglein | 6,594,500 B2 | 7/2003 | Bender |
| 6,219,557 | B1 | 4/2001 | Havinis | 6,597,311 B2 | 7/2003 | Sheynblat |
| 6,223,046 | B1 | 4/2001 | Hamill-Keays | 6,600,927 B2 | 7/2003 | Hamilton |
| 6,226,529 | B1 | 5/2001 | Bruno | 6,603,973 B1 | 8/2003 | Foladare |
| 6,239,742 | B1 | 5/2001 | Krasner | 6,606,495 B1 | 8/2003 | Korpi |
| 6,247,135 | B1 | 6/2001 | Feaugue | 6,606,554 B2 | 8/2003 | Edge |
| 6,249,680 | B1 | 6/2001 | Wax | 6,609,004 B1 | 8/2003 | Morse |
| 6,249,744 | B1 | 6/2001 | Morita | 6,611,757 B2 | 8/2003 | Brodie |
| 6,249,873 | B1 | 6/2001 | Richard | 6,618,593 B1 | 9/2003 | Drutman et al. |
| 6,253,074 | B1 | 6/2001 | Carlsson | 6,618,670 B1 | 9/2003 | Chansarkar |
| 6,253,203 | B1 | 6/2001 | O'Flaherty | 6,621,452 B2 | 9/2003 | Knockeart |
| 6,260,147 | B1 | 7/2001 | Quick, Jr. | 6,621,810 B1 | 9/2003 | Leung |
| 6,266,614 | B1 | 7/2001 | Alumbaugh | 6,628,233 B2 | 9/2003 | Knockeart |
| 6,275,692 | B1 | 8/2001 | Skog | 6,633,255 B2 | 10/2003 | Krasner |
| 6,275,849 | B1 | 8/2001 | Ludwig | 6,640,184 B1 | 10/2003 | Rabe |
| 6,278,701 | B1 | 8/2001 | Ayyagari | 6,650,288 B1 | 11/2003 | Pitt |
| 6,289,373 | B1 | 9/2001 | Dezonno | 6,661,372 B1 | 12/2003 | Girerd |
| 6,297,768 | B1 | 10/2001 | Allen, Jr. | 6,665,539 B2 | 12/2003 | Sih |
| 6,307,504 | B1 | 10/2001 | Sheynblat | 6,665,541 B1 | 12/2003 | Krasner |
| 6,308,269 | B2 | 10/2001 | Proidl | 6,671,620 B1 | 12/2003 | Garin |
| 6,313,786 | B1 | 11/2001 | Sheynblat | 6,677,894 B2 | 1/2004 | Sheynblat |
| 6,317,594 | B1 | 11/2001 | Gossman | 6,680,694 B1 | 1/2004 | Knockheart |
| 6,321,091 | B1 | 11/2001 | Holland | 6,691,019 B2 | 2/2004 | Seeley |
| 6,321,092 | B1 | 11/2001 | Fitch | 6,694,258 B2 | 2/2004 | Johnson |
| 6,321,257 | B1 | 11/2001 | Kotala | 6,694,351 B2 | 2/2004 | Shaffer |
| 6,324,524 | B1 | 11/2001 | Lent | 6,697,629 B1 | 2/2004 | Grilli |
| 6,327,473 | B1 | 12/2001 | Soliman | 6,698,195 B1 | 3/2004 | Hellinger |
| 6,327,479 | B1 | 12/2001 | Mikkola | 6,701,144 B2 | 3/2004 | Kirbas |
| 6,333,919 | B2 | 12/2001 | Gaffney | 6,703,971 B2 | 3/2004 | Pande |
| 6,360,093 | B1 | 3/2002 | Ross | 6,703,972 B2 | 3/2004 | Van Diggelen |
| 6,360,102 | B1 | 3/2002 | Havinis | 6,704,651 B2 | 3/2004 | Van Diggelen |
| 6,363,254 | B1 | 3/2002 | Jones | 6,707,421 B1 | 3/2004 | Drury |
| 6,367,019 | B1 | 4/2002 | Ansell | 6,714,793 B1 | 3/2004 | Carey |
| 6,370,389 | B1 | 4/2002 | Isomursu | 6,718,174 B2 | 4/2004 | Vayanos |
| 6,377,209 | B1 | 4/2002 | Krasner | 6,720,915 B2 | 4/2004 | Sheynblat |

| Patent | Date | Name |
|---|---|---|
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,757,545 B2 | 6/2004 | Nowak et al. |
| 6,771,742 B2 | 8/2004 | McCalmont |
| 6,772,340 B1 | 8/2004 | Peinado |
| 6,775,255 B1 | 8/2004 | Roy |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,699 B1 | 9/2004 | McCraw |
| 6,799,049 B1 | 9/2004 | Zellner |
| 6,799,050 B1 | 9/2004 | Krasner |
| 6,801,159 B2 | 10/2004 | Swope |
| 6,804,524 B1 | 10/2004 | Vandermaijden |
| 6,807,534 B1 | 10/2004 | Erickson |
| 6,810,323 B1 | 10/2004 | Bullock |
| 6,813,264 B2 | 11/2004 | Vassilovski |
| 6,813,560 B2 | 11/2004 | Van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,820,069 B1 | 11/2004 | Kogan |
| 6,829,475 B1 | 12/2004 | Lee |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,842,715 B1 | 1/2005 | Gaal |
| 6,847,618 B2 | 1/2005 | Laursen |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,876,734 B1 | 4/2005 | Summers |
| 6,882,850 B2 | 4/2005 | McConnell et al. |
| 6,885,874 B2 | 4/2005 | Grube et al. |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,230 B1 | 6/2005 | Salkini |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,940,826 B1 | 9/2005 | Simard |
| 6,940,950 B2 | 9/2005 | Dickinson |
| 6,941,144 B2 | 9/2005 | Stein |
| 6,944,540 B2 | 9/2005 | King |
| 6,947,772 B2 | 9/2005 | Minear |
| 6,950,058 B2 | 9/2005 | Davis |
| 6,957,068 B2 | 10/2005 | Hutchison |
| 6,957,073 B2 | 10/2005 | Bye |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,968,044 B2 | 11/2005 | Beason |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohles |
| 6,985,747 B2 | 1/2006 | Chithambaram |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,065,351 B2 | 6/2006 | Carter |
| 7,065,507 B2 | 6/2006 | Mohammed |
| 7,072,667 B2 | 7/2006 | Olrik |
| 7,079,857 B2 | 7/2006 | Maggenti |
| 7,103,018 B1 | 9/2006 | Hansen |
| 7,103,574 B1 | 9/2006 | Peinado |
| 7,106,717 B2 | 9/2006 | Rosseau |
| 7,110,773 B1 | 9/2006 | Wallace |
| 7,130,630 B1 | 10/2006 | Enzmann |
| 7,136,466 B1 | 11/2006 | Gao |
| 7,136,838 B1 | 11/2006 | Peinado |
| 7,151,946 B2 | 12/2006 | Maggenti |
| 7,174,153 B2 | 2/2007 | Ehlers |
| 7,177,397 B2 | 2/2007 | McCalmont |
| 7,177,398 B2 | 2/2007 | Meer |
| 7,177,399 B2 | 2/2007 | Dawson |
| 7,209,758 B1 | 4/2007 | Moll |
| 7,209,969 B2 | 4/2007 | Lahti |
| 7,218,940 B2 | 5/2007 | Niemenna |
| 7,221,959 B2 | 5/2007 | Lindquist |
| 7,245,900 B1 | 7/2007 | Lamb |
| 7,246,187 B1 | 7/2007 | Ezra |
| 7,260,186 B2 | 8/2007 | Zhu |
| 7,260,384 B2 | 8/2007 | Bales et al. |
| 7,269,428 B1 | 9/2007 | Wallenius |
| 7,321,773 B2 | 1/2008 | Hines |
| 7,330,899 B2 | 2/2008 | Wong |
| 7,333,480 B1 | 2/2008 | Clarke |
| 7,369,530 B2 | 5/2008 | Keagy |
| 7,382,773 B2 | 6/2008 | Schoeneberger |
| 7,394,896 B2 | 7/2008 | Norton |
| 7,424,293 B2 | 9/2008 | Zhu |
| 7,426,380 B2 | 9/2008 | Hines |
| 7,428,571 B2 | 9/2008 | Ichimura |
| 7,436,785 B1 | 10/2008 | McMullen |
| 7,440,442 B2 | 10/2008 | Grabelsky et al. |
| 7,450,951 B2 | 11/2008 | Vimpari |
| 7,453,990 B2 | 11/2008 | Welenson |
| 7,495,608 B1 | 2/2009 | Chen |
| 7,573,982 B2 | 8/2009 | Breen |
| 7,623,447 B1 | 11/2009 | Faccin |
| 7,747,258 B2 | 6/2010 | Farmer |
| 7,751,826 B2 | 7/2010 | Gardner |
| 7,787,611 B1 | 8/2010 | Kotelly |
| 7,881,233 B2 | 2/2011 | Bieselin |
| 7,937,067 B2 | 5/2011 | Maier |
| 8,005,683 B2 | 8/2011 | Tessesl |
| 8,027,658 B2 | 9/2011 | Suryanarayana |
| 8,060,389 B2 | 11/2011 | Johnson |
| 2001/0011247 A1 | 8/2001 | O'Flaherty |
| 2002/0037735 A1 | 3/2002 | Maggenti |
| 2002/0052214 A1 | 5/2002 | Maggenti |
| 2002/0061760 A1 | 5/2002 | Maggenti |

| | | |
|---|---|---|
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0085538 A1 | 7/2002 | Leung |
| 2002/0086676 A1 | 7/2002 | Hendry |
| 2002/0098832 A1 | 7/2002 | Fleischer et al. |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 | 8/2002 | Jagadeesan |
| 2002/0123327 A1 | 9/2002 | Vataja |
| 2002/0126656 A1 | 9/2002 | Park |
| 2002/0138650 A1 | 9/2002 | Yamamoto et al. |
| 2002/0158777 A1 | 10/2002 | Flick |
| 2002/0173317 A1 | 11/2002 | Nykanen |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0016804 A1 | 1/2003 | Sheha |
| 2003/0026245 A1 | 2/2003 | Ejzak |
| 2003/0037163 A1 | 2/2003 | Kitada |
| 2003/0040272 A1 | 2/2003 | Lelievre |
| 2003/0044654 A1 | 3/2003 | Holt |
| 2003/0065788 A1 | 4/2003 | Salomaki |
| 2003/0072318 A1 | 4/2003 | Lam |
| 2003/0078064 A1 | 4/2003 | Chan |
| 2003/0081557 A1 | 5/2003 | Mettala |
| 2003/0086539 A1 | 5/2003 | McCalmont |
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |
| 2003/0109245 A1 | 6/2003 | McCalmont |
| 2003/0114157 A1 | 6/2003 | Spitz |
| 2003/0118160 A1 | 6/2003 | Holt et al. |
| 2003/0119521 A1 | 6/2003 | Tipnis |
| 2003/0119528 A1 | 6/2003 | Pew |
| 2003/0137961 A1 | 7/2003 | Tsirtsis |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0186709 A1 | 10/2003 | Rhodes |
| 2003/0196105 A1 | 10/2003 | Fineburg |
| 2003/0204640 A1 | 10/2003 | Sahineja |
| 2003/0223381 A1 | 12/2003 | Schroderus |
| 2004/0002326 A1 | 1/2004 | Maher |
| 2004/0032485 A1 | 2/2004 | Stephens |
| 2004/0044623 A1 | 3/2004 | Wake |
| 2004/0047461 A1 | 3/2004 | Weisman et al. |
| 2004/0068724 A1 | 4/2004 | Gardner |
| 2004/0076277 A1 | 4/2004 | Kuusinen |
| 2004/0078694 A1 | 4/2004 | Lester |
| 2004/0097243 A1 | 5/2004 | Zellner |
| 2004/0098497 A1 | 5/2004 | Banet |
| 2004/0132465 A1 | 7/2004 | Mattila |
| 2004/0181689 A1 | 9/2004 | Kiyoto |
| 2004/0184584 A1 | 9/2004 | McCalmont |
| 2004/0185875 A1 | 9/2004 | Diacakis et al. |
| 2004/0190497 A1 | 9/2004 | Knox |
| 2004/0192271 A1 | 9/2004 | Eisner |
| 2004/0198332 A1 | 10/2004 | Lundsgaard |
| 2004/0198386 A1 | 10/2004 | Dupray |
| 2004/0205151 A1 | 10/2004 | Sprigg |
| 2004/0229632 A1 | 11/2004 | Flynn |
| 2004/0242238 A1 | 12/2004 | Wang |
| 2005/0028034 A1 | 2/2005 | Gantman |
| 2005/0039178 A1 | 2/2005 | Marolia |
| 2005/0041578 A1 | 2/2005 | Huotari |
| 2005/0043037 A1 | 2/2005 | Loppe |
| 2005/0053209 A1 | 3/2005 | D'Evelyn |
| 2005/0074107 A1 | 4/2005 | Renner |
| 2005/0078612 A1 | 4/2005 | Lang |
| 2005/0083911 A1 | 4/2005 | Grabelsky |
| 2005/0086467 A1 | 4/2005 | Asokan |
| 2005/0090236 A1 | 4/2005 | Schwinke |
| 2005/0101335 A1 | 5/2005 | Kelly |
| 2005/0107673 A1 | 5/2005 | Ball |
| 2005/0112030 A1 | 5/2005 | Gaus |
| 2005/0119012 A1 | 6/2005 | Merheb |
| 2005/0134504 A1 | 6/2005 | Harwood |
| 2005/0135569 A1 | 6/2005 | Dickinson |
| 2005/0136885 A1 | 6/2005 | Kaltsukis |
| 2005/0169248 A1 | 8/2005 | Truesdale |
| 2005/0201529 A1 | 9/2005 | Nelson |
| 2005/0209995 A1 | 9/2005 | Aksu |
| 2005/0213716 A1 | 9/2005 | Zhu |
| 2005/0232252 A1 | 10/2005 | Hoover |
| 2005/0238156 A1 | 10/2005 | Turner |
| 2005/0255857 A1 | 11/2005 | Kim |
| 2005/0259675 A1 | 11/2005 | Tuohino |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0010200 A1 | 1/2006 | Mousseau |
| 2006/0023747 A1 | 2/2006 | Koren et al. |
| 2006/0026288 A1 | 2/2006 | Acharya |
| 2006/0053225 A1 | 3/2006 | Poikselka |
| 2006/0068753 A1 | 3/2006 | Karpen |
| 2006/0077911 A1 | 4/2006 | Shaffer |
| 2006/0078094 A1 | 4/2006 | Breen |
| 2006/0088152 A1 | 4/2006 | Green |
| 2006/0104306 A1 | 5/2006 | Adamczkk |
| 2006/0120517 A1 | 6/2006 | Moon |
| 2006/0135177 A1 | 6/2006 | Winterbottom |
| 2006/0188083 A1 | 8/2006 | Breen |
| 2006/0193447 A1 | 8/2006 | Schwartz |
| 2006/0212558 A1 | 9/2006 | Sahinoja |
| 2006/0212562 A1 | 9/2006 | Kushwaha |
| 2006/0234639 A1 | 10/2006 | Kushwaha |
| 2006/0234698 A1 | 10/2006 | Fok |
| 2006/0239205 A1 | 10/2006 | Warren |
| 2006/0250987 A1 | 11/2006 | White |
| 2006/0258380 A1 | 11/2006 | Liebowitz |
| 2006/0293024 A1 | 12/2006 | Benco |
| 2006/0293066 A1 | 12/2006 | Edge |
| 2007/0003024 A1 | 1/2007 | Olivier |
| 2007/0019614 A1 | 1/2007 | Hoffman |
| 2007/0022011 A1 | 1/2007 | Altberg |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0036139 A1 | 2/2007 | Patel |
| 2007/0041513 A1 | 2/2007 | Gende |
| 2007/0049288 A1 | 3/2007 | Lamprecht |
| 2007/0060097 A1 | 3/2007 | Edge |
| 2007/0081635 A1 | 4/2007 | Croak |
| 2007/0115941 A1 | 5/2007 | Patel |
| 2007/0121601 A1 | 5/2007 | Kikinis |
| 2007/0149213 A1 | 6/2007 | Lamba |
| 2007/0160036 A1 | 7/2007 | Smith |
| 2007/0162228 A1 | 7/2007 | Mitchell |
| 2007/0201623 A1 | 8/2007 | Hines |
| 2007/0242660 A1 | 10/2007 | Xu |
| 2007/0263610 A1 | 11/2007 | Mitchell |
| 2008/0032703 A1 | 2/2008 | Krumm |
| 2008/0037715 A1 | 2/2008 | Prozeniuk |
| 2008/0063153 A1 | 3/2008 | Krivorot |
| 2008/0065775 A1 | 3/2008 | Polk |
| 2008/0186164 A1 | 8/2008 | Emigh |
| 2008/0214202 A1 | 9/2008 | Toomey |
| 2011/0113060 A1 | 5/2011 | Martini |
| 2011/0273568 A1 | 11/2011 | Lagassey |
| 2012/0001750 A1 | 1/2012 | Monroe |
| 2012/0189107 A1 | 7/2012 | Dickinson |

FOREIGN PATENT DOCUMENTS

| | | |
|---|---|---|
| WO | WO02057869 | 7/2002 |
| WO | WO2005/051033 | 6/2005 |
| WO | WO2007027166 | 3/2007 |

OTHER PUBLICATIONS

International Search Report in PCT/US007/23243 dated Apr. 2, 2008.

Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.

Location Based Services V2 Roaming Support (non proprietary), 80-V8470-2NP A, dated Jan. 27, 2005, pp. 1-56.

Yilin Ahao, Efficient and reliable date transmission for cellular and GPS based mayday systems, Nov. 1997, IEEE, IEEE Conference on Intelligent Transportation System, 1997. ITSC 97, 555-559.

Diagram showing a LCS request generating a Presence response.

LOCATION DERIVED PRESENCE INFORMATION

This application is a continuation of U.S. patent application Ser. No. 12/007,947, entitled "Location Derived Presence Information," to Hines et al., filed on Jan. 17, 2008, now U.S. Pat. No. 8,032,112; which in turn is a continuation of U.S. patent application Ser. No. 10/395,217, entitled "Location Derived Presence Information," to Hines et al., filed on Mar. 25, 2003, now U.S. Pat. No. 7,426,380; which claims priority from U.S. Provisional Appl. No. 60/367,708, entitled "Location Derived Presence Information", filed Mar. 28, 2002, by Hines et al., the entirety of all of which is are explicitly incorporated herein by reference.

BACKGROUND OF THE INVENTION

1. Field of the Invention

This invention relates generally to wireless communication carriers. More particularly, it relates to location and presence-based services for the wireless industry.

2. Background of Related Art

The term "presence" in the wireless world typically relates to a network answer to the simple question "Are you available?". For instance, if a subscriber's wireless device is turned off, they would not be available. However, if a subscriber's wireless device is turned on, and in communication with a carrier, the carrier would most likely be able to indicate to a relevant request that the subscriber is available and thus "present". The functions and use of presence information is well known in the art.

Location information regarding subscribers is increasingly becoming available in a wireless network. This is particularly true in systems that comply with E-9-1-1 requirements. Location information relates to absolute coordinates of a wireless device.

Both Location and Presence services are message intensive on telecom networks. Message reduction in general is desirable, both to allow increased capacity in a wireless network, as well as to improve reliability of the system by reducing the number of messages.

SUMMARY OF THE INVENTION

In accordance with the principles of the present invention, a method and apparatus provides presence information regarding a wireless device. A request for location information regarding a wireless device is received. Presence information regarding the wireless device is provided in response to the receipt of the request for location information regarding the wireless device.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
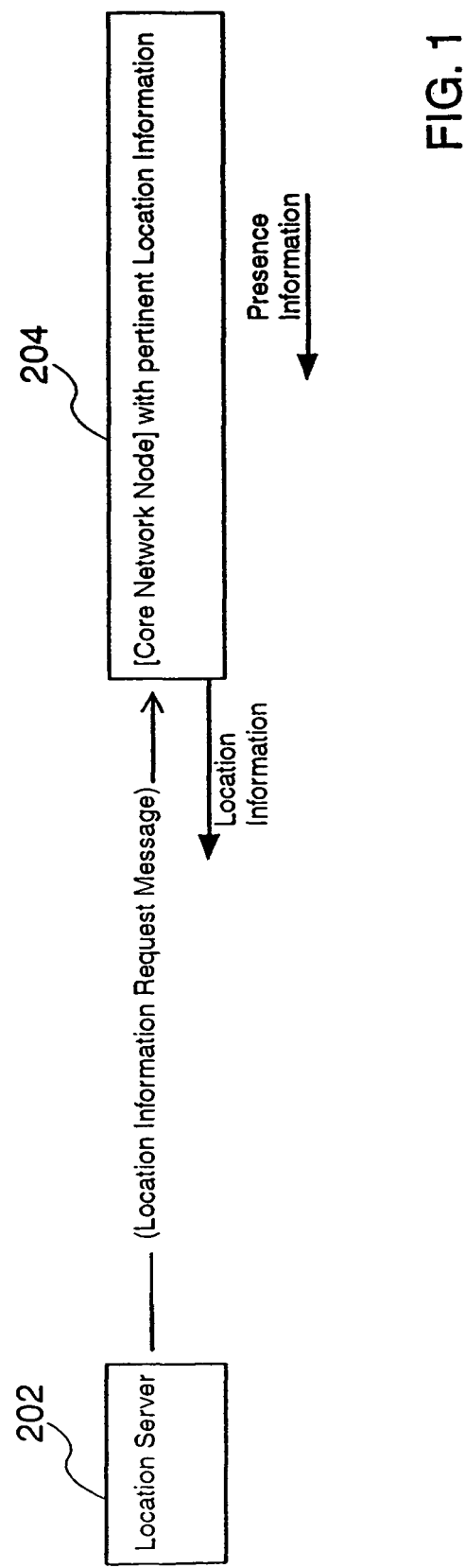
FIG. 1 shows generally a location request.

The present invention recognizes the duplicity of information provided by location and presence services, and reduces the number of messages required in networks where both Location and Presence services are deployed.

To reduce the amount of messaging within the core network, the present invention retrieves presence data from messages intended to provide location information. Thus, information determined in a Location service scheme is utilized to provide a presence service as well.

In accordance with the present invention, a Location Server requests mobile subscriber (MS) information from a Core Network (CN) Node (i.e. HLR, MSC, etc.) that can be used in determining the Location of the MS. In most cases the messages used for requesting Location and Presence services are the same. The proposed concept uses a single message to aggregate information for two services, specifically Location and Presence.

Entirely new revenue streams may be realized by carriers through a location services solution, e.g., the Xypoint Location Platform (XLP) available from TeleCommunication Systems, Inc. in Annapolis, Md. The XLP preferably integrates three centers that wireless carriers should have to effectively gather, manage, protect and distribute wireless data, and ultimately, collect revenue from subscribers for doing so. With the ability to offer the full array of location-based services-everything from enhanced 411 services, to location-based games, child tracking and location-specific advertising-carriers can add a whole new profit center to their business models, including generating non-subscriber revenue. The three module centers in the exemplary XLP used in the disclosed embodiments are a Location Center, a Presence Center, and a Privacy Center.

Location Center—Determines the location of mobile users from the wireless network and provides a single point of access for location-based applications. The XLP Location Center preferably includes a mobile positioning center (MPC), e.g., a fully J-STD-036-compliant Mobile Positioning Center (MPC) to deliver E911 Phase I services.

Presence Center—Enhances an application's ability to communicate with the mobile user by determining the state and availability of the mobile user to receive a text message, WAP push or incoming call. Presence enables applications such as instant messaging and allows for options such as determining who on your "buddy list," is available.

Privacy Center—Ensures that carriers and mobile subscribers are firmly in control of their data. It allows users to choose exactly which location and presence information to make available to specific vendors or other users.

The XLP is preferably implemented as either a fully turnkey (in-house), hosted or hybrid solution, allowing carriers to pick and choose the best solution to meet their business needs. Whether a carrier opts for in-house or hosted services, the XLP provides a highly available and scalable distributed network architecture. The XLP also offers carriers the flexibility to choose the position determining entity (PDE) that will best meet their current needs while also minimizing over-lapping integration of applications and services.

The MPC technology integrated within the XLP's Location Center has been deployed to support E911 Phase I services. The Xypoint Location Platform available from TeleCommunication Systems, Inc. has been integrated with well over 100 commercially available switches-including Lucent, Nortel, Motorola and Ericsson. The XLP is preferably network independent and supports all major wireless interfaces, including GSM, CDMA, TDMA and AMPS.

FIG. 1 shows generally a location request to a core network node containing pertinent location information, resulting not only in a return of location information, but also in the spawning of presence information.

In particular, as shown in FIG. 1, a location server 202 requests location information regarding a particular mobile subscriber (MS) from a core network node 204, e.g., from a Mobile Switch Center (MSC). Requested information regarding a particular wireless device (MS) may include, e.g., attach, detach, and location area update. The location server 202 may also request information regarding the wireless device such as attach, detach and/or location area update from a Packet Date Node (e.g., SGSN, GGSN, or PDSN).

Typically, location information regarding a particular wireless device is requested of a home location register (HLR). In accordance with the principles of the present invention, the home location register can also serve as a basis for presence services. Exemplary presence services may include, e.g., the state and/or status of a subscriber.

Importantly, in accordance with the present invention, information relating to presence is spawned or triggered by a location request. The presence information may or may not be returned along with the location information, but preferably is included within the message (or messages) containing location information.

Figure 2:
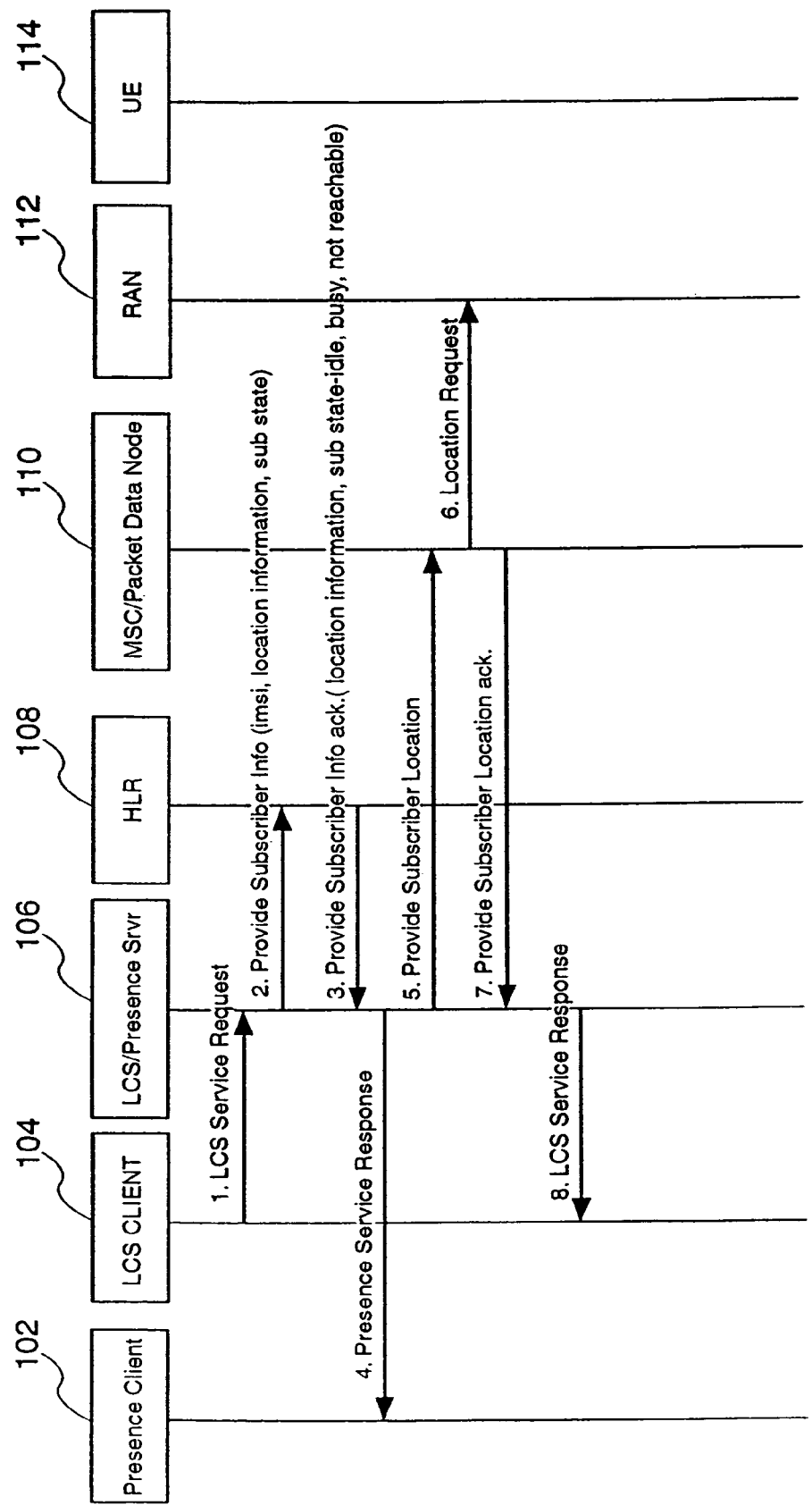
FIG. 2 shows a LoCation Services (LCS) request generating a presence response, in accordance with the principles of the present invention.

FIG. 2 shows an exemplary LoCation Services (LCS) request generating a response including presence information in more detail, in accordance with the principles of the present invention.

In particular, FIG. 2 shows exemplary messaging between a presence client 102, a location service client 104, a location/presence server 106, a home location register (HLR) 108, a core network node such as an MSC or packet data node 110, and a radio access network (RAN) 112.

In the exemplary embodiment, the messaging cycle is initiated (shown in Step 1) by a location services client 104, that transmits a location request message to a location services/presence server 106 in the relevant carrier's network.

In step 2, a Provide Subscriber Info message is transmitted by the location services/presence services server 106 to the home location register 108 (or other node containing location and/or presence information). The Provide Subscriber Info message can request location information and/or subscriber state. In this use case, location information regarding a particular subscriber is being requested, and within the same message, presence information such as subscriber state may also be requested. Requested presence information can include, e.g., idle, bust, not reachable, etc.

In step 3, the network node containing the location and presence information (e.g., the Home Location Register (HLR) 108) provides the requested location information and presence information (e.g., idle, bust, not reachable, etc.) back to the location services/presence services server 106.

In step 4, the location services/presence services server 106 uses the returned subscriber info, and transmits a Presence Service Response to a relevant presence application, e.g., a presence client 102 depicted in FIG. 2.

This 'freebie' presence information is an important aspect of the present invention. For instance, an entirely separate presence application 102 may register with a particular carrier, perhaps paying suitable fees, for the right to receive presence information for those wireless devices that have had location information returned. This avoids the need for the presence client 102 to separately request presence information regarding that particular wireless device.

In step 5, the location services/presence services server 106 requests updated location information of the wireless network, i.e., sending a request for current location information from a relevant network node (e.g., the MSC or packet data node 110).

The MSC, packet data node 110, etc. may determine a current location of the relevant wireless device using any suitable location technology, e.g., using a global positioning satellite (GPS) system, using triangulation, using angle of arrival, etc.

As part of the determination of a current location of the wireless device, as shown in step 6, the location request may be forwarded to a Radio Access Network. This would be necessary for certain locating technologies (e.g., for triangulation, angle of arrival, etc.). If a global positioning satellite system is utilized, the location request may be forwarded to a suitable GPS application in the wireless network that receives GPS location information regarding a relevant wireless device.

In step 7, a response to the update location information request is transmitted to the location services/presence services server 106. (The updated location information may also be forwarded to the HLR (not shown in FIG. 2) to update the current location of the relevant wireless device).

Lastly, in step 8, the location information initially requested by the LCS application or client 104 is returned. This returned information ideally includes current location information freshly obtained from the MSC 110 or other network node, but may instead be cached location information stored in the HLR 108 if the location information is not returned within a sufficient time window (e.g., causing a timeout).

The present invention provides benefits such as reducing core network messaging traffic, providing better XLP performance, and allowing the use of cached presence data relating to wireless devices, allowing quick and easy access to presence data.

While the invention has been described with reference to the exemplary embodiments thereof, those skilled in the art will be able to make various modifications to the described embodiments of the invention without departing from the true spirit and scope of the invention.

What is claimed is:

1. A method of providing presence information regarding a wireless device, comprising:
   receiving, by a physical home location register, a request for location information regarding a physical wireless device;
   formulating, at said physical home location register, a data message including presence information regarding said physical wireless device in response to said request for location information; and
   triggering transmission of said data message including said presence, in response to said request for location information.

2. The method of providing presence information regarding a wireless device according to claim 1, wherein said presence information comprises at least one of the following:
   a state of said physical wireless device; and
   a status of said physical wireless device.

3. The method of providing presence information regarding a wireless device according to claim 1, wherein:
   said presence information is transmitted to another wireless device other than said physical wireless device.

4. The method of providing presence information regarding a wireless device according to claim 1, wherein:
   said location information and said presence information are maintained in said physical home location register.

5. The method of providing presence information regarding a wireless device according to claim 1, further comprising:

retrieving said location information regarding said physical wireless device from a core network node.

6. The method of providing presence information regarding a wireless device according to claim 5, wherein:
said core network node is a message service center.

7. The method of providing presence information regarding a wireless device according to claim 1, further comprising:
obtaining last known location information regarding said physical wireless device to provide as requested location information.

8. The method of providing presence information regarding a wireless device according to claim 1, further comprising:
obtaining requested location information from cached memory.

9. The method of providing presence information regarding a wireless device according to claim 1, further comprising:
obtaining requested location information from a radio access network.

10. The method of providing presence information regarding a wireless device according to claim 1, further comprising:
obtaining requested location information from a global positioning satellite (GPS) system.

11. A location services system for providing presence information regarding a wireless device, comprising:
a physical home location register to receive a request for location information regarding a physical wireless device, to formulate a data message including presence information regarding said physical wireless device in response to said request for location information, and to transmit said data message including said presence information; and
a presence server to transmit said data message including said presence information triggered in response to said request for location information.

12. The location services system for providing presence information regarding a wireless device according to claim 11, wherein said presence information comprises at least one of the following:
a state of said physical wireless device; and
a status of said physical wireless device.

13. The location services system for providing presence information regarding a wireless device according to claim 11, wherein:
said presence information is provided to another wireless device other than said physical wireless device.

14. The location services system for providing presence information regarding a wireless device according to claim 11, wherein:
said home location register obtains requested location information from a global positioning satellite (GPS) system.

15. The location services system for providing presence information regarding a wireless device according to claim 11, wherein:
said home location server obtains requested location information from a core network node.

16. The location services system for providing presence information regarding a wireless device according to claim 15, wherein:
said core network node is a message service center.

17. The location services system for providing presence information regarding a wireless device according to claim 11, wherein:
said location server obtains last known location information regarding said physical wireless device to provide as requested location information.

18. The location services system for providing presence information regarding a wireless device according to claim 11, wherein:
requested location information is obtained from cached memory.

19. The location services system for providing presence information regarding a wireless device according to claim 11, wherein:
requested location information is obtained from a radio access network.

20. The location services system for providing presence information regarding a wireless device according to claim 11, wherein:
requested location information is obtained from a global positioning satellite (GPS) system.

* * * * *